United States Patent
Li et al.

(10) Patent No.: US 10,432,104 B2
(45) Date of Patent: Oct. 1, 2019

(54) CONTROL CIRCUIT FOR SYNCHRONOUS RECTIFIER AND THE METHOD THEREOF

(71) Applicant: Chengdu Monolithic Power Systems Co., Ltd., Chengdu (CN)

(72) Inventors: Hui Li, Hangzhou (CN); Lei Miao, Hanzhou (CN); Siran Wang, Hangzhou (CN); Lin Feng, Chengdu (CN)

(73) Assignee: Chengdu Monolithic Power Systems Co., Ltd., Chengdu (CN)

( * ) Notice: Subject to any disclaimer, the term of this patent is extended or adjusted under 35 U.S.C. 154(b) by 0 days.

(21) Appl. No.: 16/022,645

(22) Filed: Jun. 28, 2018

(65) Prior Publication Data

US 2019/0020282 A1    Jan. 17, 2019

(30) Foreign Application Priority Data

Jul. 11, 2017    (CN) .......................... 2017 1 0561412

(51) Int. Cl.
*H02M 3/335* (2006.01)
*H02M 1/08* (2006.01)

(52) U.S. Cl.
CPC ......... *H02M 3/33592* (2013.01); *H02M 1/08* (2013.01); *Y02B 70/1475* (2013.01)

(58) Field of Classification Search
CPC ............... H02M 3/335; H02M 3/1588; H02M 3/33592; H02M 3/33576; H02M 7/217
See application file for complete search history.

(56) References Cited

U.S. PATENT DOCUMENTS

| | | | | |
|---|---|---|---|---|
| 10,175,297 | B2 * | 1/2019 | Cilek | G01R 31/31937 |
| 2008/0055942 | A1 * | 3/2008 | Tao | H02M 3/33592 363/21.03 |
| 2009/0231895 | A1 * | 9/2009 | Hu | H02M 3/33592 363/127 |
| 2009/0268494 | A1 * | 10/2009 | Hu | H02M 1/08 363/89 |
| 2009/0273951 | A1 * | 11/2009 | Ren | H02M 3/33592 363/21.06 |
| 2010/0124086 | A1 * | 5/2010 | Chen | H02M 3/33592 363/127 |
| 2011/0051464 | A1 * | 3/2011 | Lou | H02M 3/33592 363/21.02 |
| 2011/0063877 | A1 * | 3/2011 | Yang | H02M 3/33592 363/21.06 |
| 2011/0096578 | A1 * | 4/2011 | Fang | H02M 3/33592 363/127 |
| 2012/0300520 | A1 | 11/2012 | Ren et al. | |
| 2014/0376272 | A1 * | 12/2014 | Miao | H02M 3/33592 363/21.02 |

(Continued)

*Primary Examiner* — Gary L Laxton
*Assistant Examiner* — Sisay G Tiku
(74) *Attorney, Agent, or Firm* — Perkins Coie LLP

(57) ABSTRACT

A synchronous switching converter with an energy storage component and a synchronous rectifier coupled to the energy storage component, having: a secondary control circuit configured to receive a slew rate threshold adjusting signal and a voltage across the synchronous rectifier, and to provide a secondary control signal; wherein the secondary control circuit detects a slew rate of the voltage across the synchronous rectifier, and maintains the synchronous rectifier being off when the slew rate of the voltage across the synchronous rectifier is lower than a slew rate threshold.

16 Claims, 8 Drawing Sheets

(56) References Cited

U.S. PATENT DOCUMENTS

| | | | |
|---|---|---|---|
| 2015/0049521 A1* | 2/2015 | Iorio | H02M 3/1588 |
| | | | 363/21.02 |
| 2015/0049529 A1* | 2/2015 | Iorio | H02M 3/33507 |
| | | | 363/89 |
| 2015/0103567 A1 | 4/2015 | Wang et al. | |
| 2015/0103569 A1* | 4/2015 | Zhang | H02M 3/33507 |
| | | | 363/21.16 |
| 2015/0146457 A1* | 5/2015 | Strijker | H02M 1/08 |
| | | | 363/21.14 |
| 2016/0087544 A1 | 3/2016 | Jin et al. | |
| 2017/0155335 A1* | 6/2017 | Chang | H02M 1/08 |
| 2017/0353099 A1* | 12/2017 | Yang | H02M 1/08 |
| 2019/0006949 A1* | 1/2019 | Kikuchi | H02M 3/33523 |

\* cited by examiner

CONTROL CIRCUIT FOR SYNCHRONOUS RECTIFIER AND THE METHOD THEREOF

CROSS-REFERENCE TO RELATED APPLICATIONS

This application claims priority to and the benefit of Chinese Patent Application No. 201710561412.6, filed on Jul. 11, 2017, which is incorporated herein by reference in its entirety.

FIELD

The present technology relates generally to electronic circuits, and more particularly but not exclusively to switching converters and the method thereof.

BACKGROUND

Generally speaking, two types of rectifying schemes may be adopted in a secondary side of an isolated switching converter: (1) non-synchronous rectifying with a diode (FIG. 1A), and (2) synchronous rectifying with a synchronous rectifier, e.g., an N-MOSFET (FIG. 1B). The power dissipation-current characteristic is plotted in FIG. 2, for a diode (curve 12) and a synchronous rectifier (curve 11). In practical applications, the work area of a low power isolated switching converter always falls into the shadowed area. In the shadowed area, curve 11 is always above curve 12, i.e., the power dissipation of a diode is higher than the power dissipation of a synchronous rectifier. So, compared with a diode, a synchronous rectifier is more preferable because of less power waste and better efficiency in the low power isolated switching converter. Moreover, the temperature characteristic of the synchronous rectifier is better than that of the diode because of less power dissipation.

Synchronous rectifiers have thus found increasingly wide applications in devices sensitive to power efficiency, such as laptop adapters, wireless equipment, LCD power management modules, power over Ethernet, and so on.

In the synchronous rectified switching converter, a voltage across the synchronous rectifier may be adopted to determine the on and off of the synchronous rectifier. However, the ringing of the voltage across the synchronous rectifier after the synchronous rectifier is turned off may cause mis-trigger.

SUMMARY

The present technology provides a control circuit to avoid mis-trigger of the synchronous rectifier of the isolated switching converter.

There has been provided, in accordance with an embodiment of the present technology, a synchronous switching converter with an energy storage component and a synchronous rectifier coupled to the energy storage component, comprising: a secondary control circuit having a first input terminal configured to receive a slew rate threshold adjusting signal, a second input terminal configured to receive a voltage across the synchronous rectifier, and an output terminal configured to provide a secondary control signal based on the slew rate threshold adjusting signal and the voltage across the synchronous rectifier to control the synchronous rectifier; and wherein the secondary control circuit detects a slew rate of the voltage across the synchronous rectifier, and maintains the synchronous rectifier being off when the slew rate of the voltage across the synchronous rectifier is lower than a slew rate threshold.

There has been provided, in accordance with an embodiment of the present technology, a control method of a synchronous switching converter having an energy storage component and a synchronous rectifier coupled to the energy storage component, comprising: detecting a slew rate of a voltage across the synchronous rectifier; and keeping the synchronous rectifier being off when the slew rate of the voltage across the synchronous rectifier is lower than a slew rate threshold.

There has been provided, in accordance with an embodiment of the present technology, a synchronous switching converter comprising: an energy storage component; a synchronous rectifier coupled to the energy storage component; a secondary control circuit configured to receive a slew rate threshold adjusting signal and a voltage across the synchronous rectifier, and to provide a secondary control signal based on the slew rate threshold adjusting signal and the voltage across the synchronous rectifier to control the synchronous rectifier; and an off-chip component configured to provide the slew rate threshold adjusting signal; wherein the secondary control circuit detects a slew rate of the voltage across the synchronous rectifier, and maintains the synchronous rectifier being off when the slew rate of the voltage across the synchronous rectifier is lower than a slew rate threshold.

The present technology determines the off state of the synchronous rectifier by a slew rate of the voltage across the synchronous rectifier, so as to avoid mis-trigger of the synchronous rectifier caused by ringing of the voltage across the synchronous rectifier.

The use of the same reference label in different drawings indicates the same or like components.

DETAILED DESCRIPTION

In the present technology, numerous specific details are provided, such as examples of circuits, components, and methods, to provide a thorough understanding of embodiments of the technology. Persons of ordinary skill in the art will recognize, however, that the technology can be practiced without one or more of the specific details. In other instances, well-known details are not shown or described to avoid obscuring aspects of the technology.

Figure 1A:
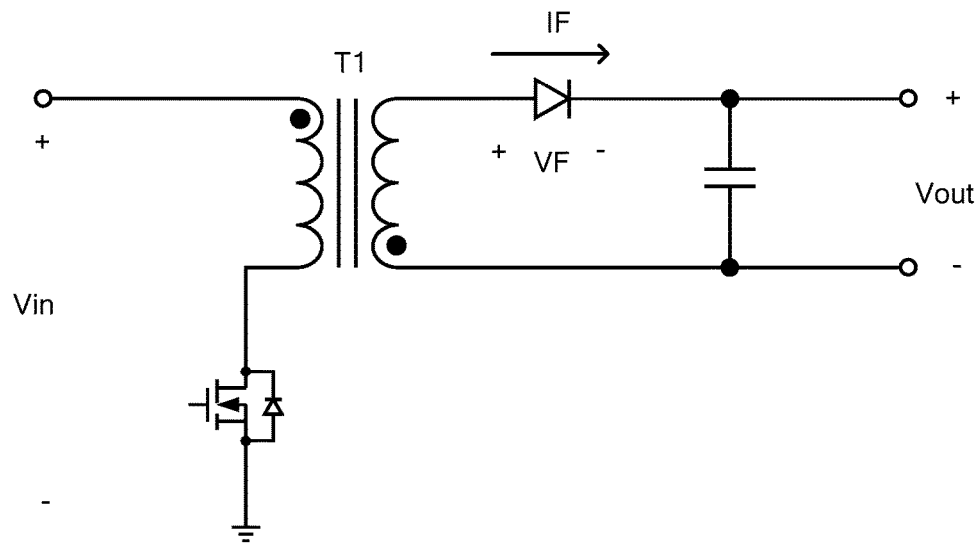
FIG. 1A schematically shows a flyback converter with non-synchronous rectifying.
Figure 1B:
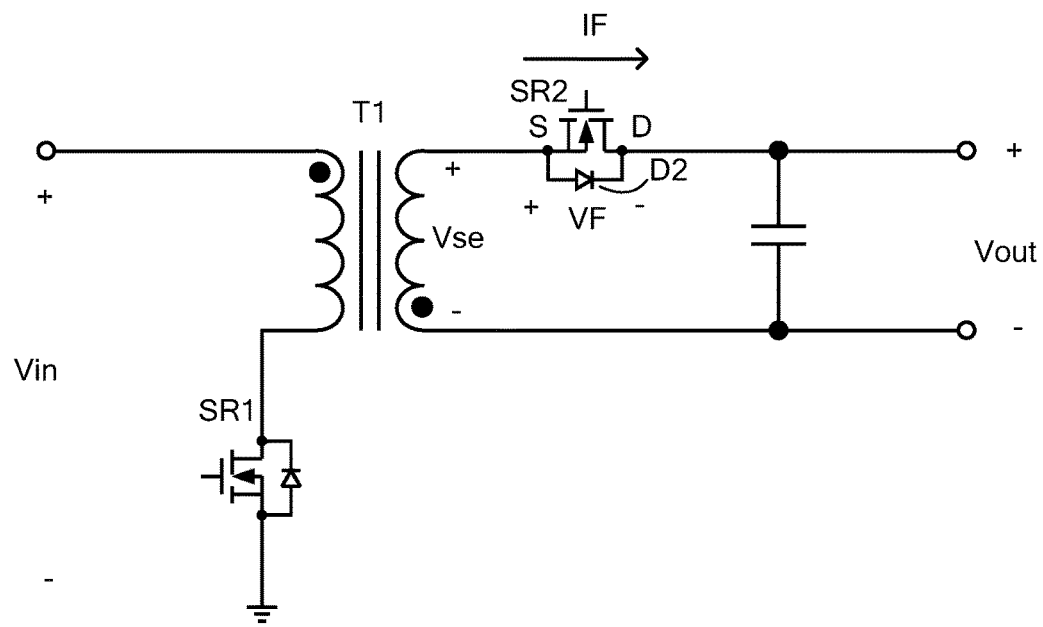
FIG. 1B schematically shows a flyback converter with synchronous rectifying.
Figure 2:
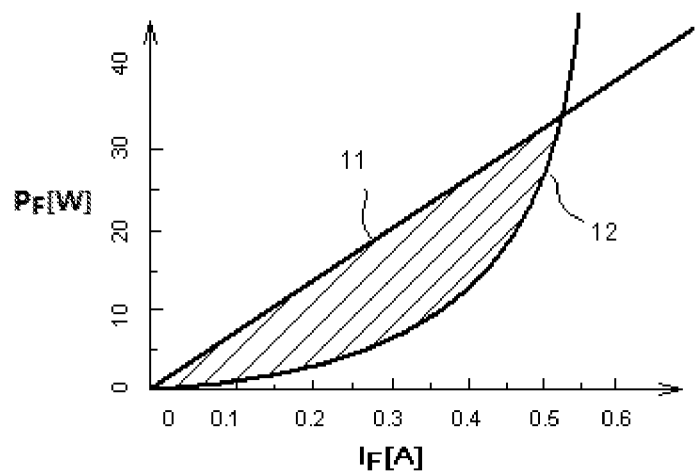
FIG. 2 shows the power dissipation-current characteristic of switching converters with synchronous rectifier and non-synchronous rectifier.
Figure 3:
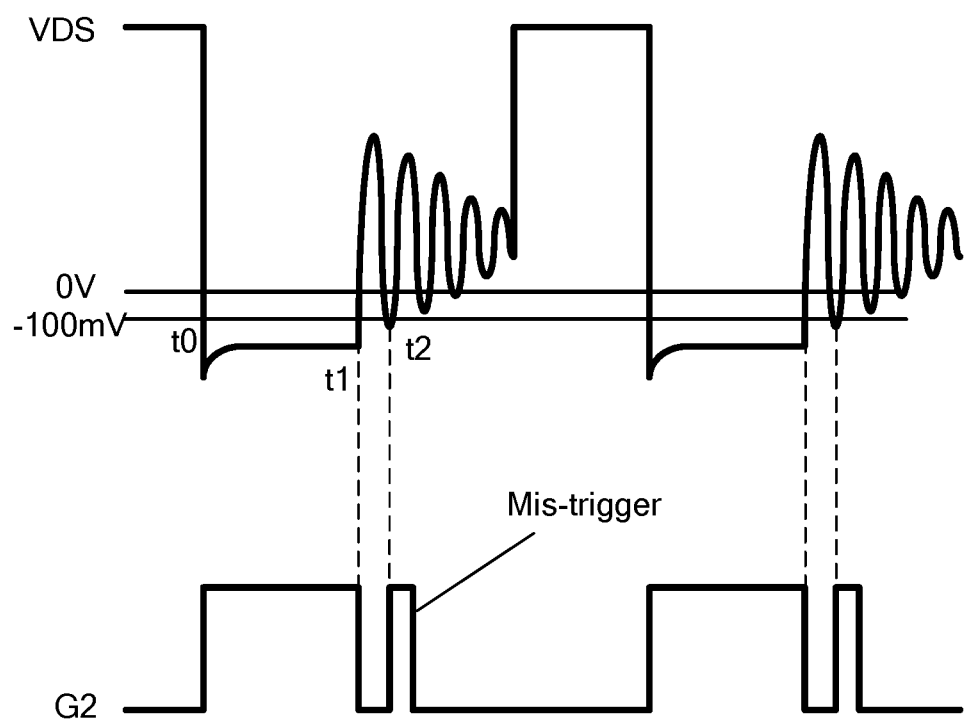
FIG. 3 schematically shows waveforms of a drain-source voltage VDS and a control signal G2 of the synchronous rectifier SR2 of the synchronous flyback converter under DCM (Discontinuous Current Mode).

The present technology is illustrated with the example of a synchronous flyback converter. MOSFET (Metal Oxide Semiconductor Filed Effect Transistor) is adopted as the synchronous rectifier SR2 of the flyback converter. FIG. 3 schematically shows waveforms of a drain-source voltage VDS and a control signal G2 of the synchronous rectifier SR2 of the synchronous flyback converter under DCM (Discontinuous Current Mode). The drain-source voltage VDS is also referred as a switch voltage or a voltage across the synchronous rectifier SR2 in this disclosure. Normally, when a primary switch SR1 coupled to a primary winding of a transformer T1 is turned on, an input voltage Vin as shown in FIG. 1B is configured to a dotted terminal of the primary winding. Then, a dotted terminal of the secondary winding is positive and the drain-source voltage VDS is positive too. As a result, a body diode D2 of the synchronous rectifier SR2 is reverse biased. At time t0, the primary switch SR1 is turned off, energy stored in the primary winding is transferred to the secondary winding of the transformer T1. A current flowing through the secondary winding from the dotted terminal gets the body diode D2 forward biased. As a result, the drain-source voltage VDS=−VF decreases to a negative value, wherein VF is a forward voltage drop of the body diode D2 of the synchronous rectifier SR2. In some applications, on and off of the synchronous rectifier SR2 is determined by a comparison result of the drain-source voltage VDS with a preset threshold, wherein the comparison result is reflected by the secondary control signal G2. The control scheme is: when the drain-source voltage VDS of the synchronous rectifier SR2 decreases to a first preset value, e.g., −100 mV, the synchronous rectifier SR2 is turned on by the secondary control signal G2; when the drain-source voltage VDS of the synchronous rectifier SR2 increases to a second preset value, e.g., 0V, the synchronous rectifier is turned off by the secondary control signal G2. As can be seen from FIG. 3, the synchronous rectifier SR2 is supposed to be turned off after time t1 when the drain-source voltage VDS increases to 0V. But when the flyback converter works under DCM in real application, the drain-source voltage VDS rings after the synchronous rectifier SR2 is turned off and rings down to −100 mV at time t2. Finally, the synchronous rectifier SR2 is unexpectedly turned on (mis-triggered) by the secondary control signal G2 at time t2.

Figure 4:
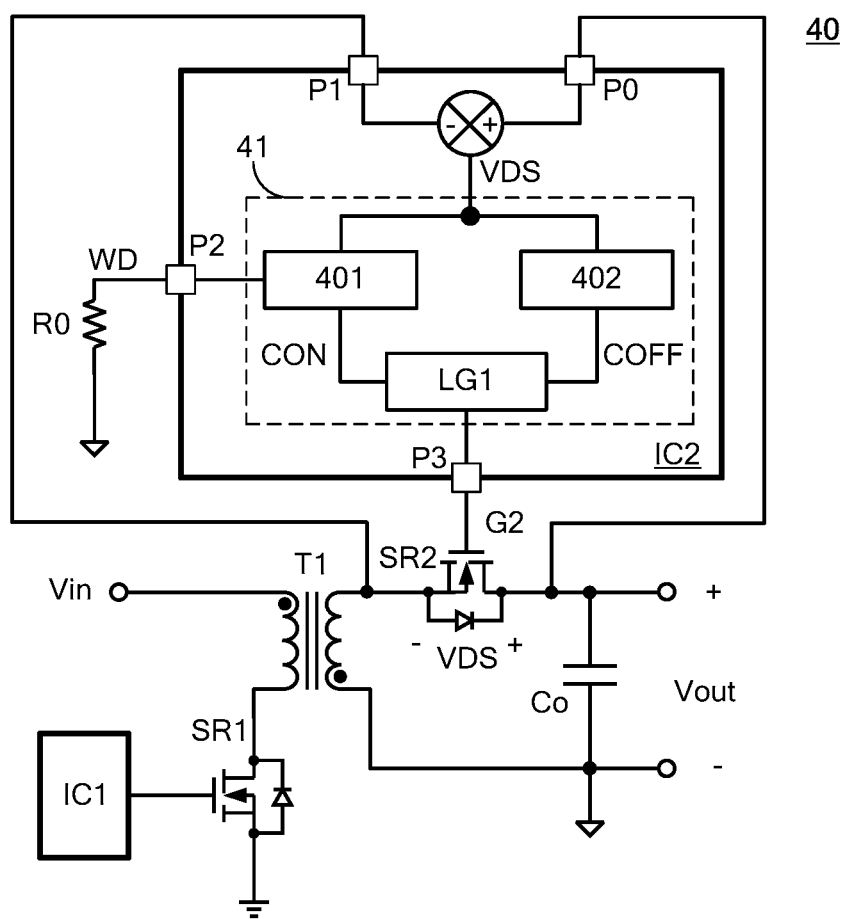
FIG. 4 schematically shows a switching converter 40 in accordance with an embodiment of the present technology.

To avoid mis-trigger of the synchronous rectifier SR2, FIG. 4 schematically shows a switching converter 40 in accordance with an embodiment of the present technology. As shown in FIG. 4, the switching converter 40 comprises an energy storage component T1, a primary switch SR1 coupled to the energy storage component T1, a primary control chip IC1 configured to control the primary switch SR1, a synchronous rectifier coupled to the energy storage component T1, and a secondary control chip IC2 configured to control the synchronous rectifier SR2. The secondary control circuit 41 is integrated in the secondary control chip IC2, and comprises a first input terminal configured to receive a slew rate threshold adjusting signal WD, a second input terminal configured to receive a drain-source voltage VDS, i.e., the voltage across the synchronous rectifier SR2, and an output terminal configured to provide the secondary control signal G2 based on the slew rate threshold adjusting signal WD and the drain-source voltage VDS to control the synchronous rectifier SR2. Specifically, the secondary control circuit 41 comprises: an on control circuit 401 having a first input terminal configured to receive the drain-source voltage VDS, a second input terminal configured to receive the slew rate threshold adjusting signal WD, and an output terminal configured to provide an on control signal CON based on the drain-source voltage VDS and the slew rate threshold adjusting signal WD; an off control circuit 402 having an input terminal configured to receive the drain-source voltage VDS, and an output terminal configured to provide an off control signal COFF based on the drain-source voltage VDS; and a logic circuit LG1 having a first input terminal configured to receive the on control signal CON, a second input terminal configured to receive the off control signal COFF, and an output terminal configured to provide the secondary control signal G2 based on the on control signal CON and the off control signal COFF.

In one embodiment, the secondary control circuit 41 detects the slew rate of the drain-source voltage VDS, and provides the secondary control signal G2 to keep an off state of the synchronous rectifier SR2 unchanged when the slew rate of the drain-source voltage VDS is lower than a preset slew rate threshold. The slew rate threshold adjusting signal WD is adopted to adjust the said preset slew rate threshold.

In the example of FIG. 4, the secondary control chip IC2 has pins P0-P3, wherein: the pins P0 and P1 are respectively coupled to a drain terminal and a source terminal of the synchronous rectifier SR2, so as to detect the drain-source voltage VDS of the synchronous rectifier SR2; the pin P2 is configured to connect the first input terminal of the on control circuit 401 to an off-chip resistor R0; the pin P3 is configured to provide the secondary control signal G2 to a control terminal of the synchronous rectifier SR2. A voltage signal across the off-chip resistor R0 is adopted as the slew rate threshold adjusting signal WD, and could be changed by varying a resistance of the resistor R0.

In one embodiment, the synchronous rectifier SR2 is integrated in the secondary control chip IC2 with the secondary control circuit 41.

Figure 5:
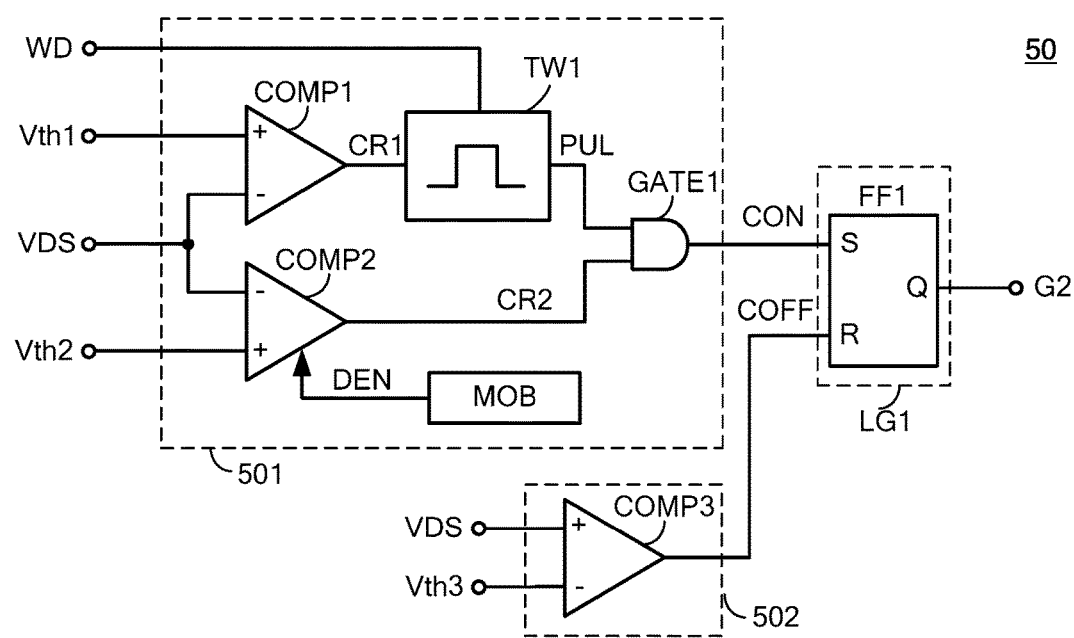
FIG. 5 schematically shows a secondary control circuit 50 in accordance with an embodiment of the present technology.

FIG. 5 schematically shows a secondary control circuit 50 in accordance with an embodiment of the present technology. As shown in FIG. 5, the secondary control circuit 50 comprises an on control circuit 501, an off control circuit 502 and a logic circuit LG1.

In one embodiment, the on control circuit 501 comprises: a first comparator COMP1 having a first input terminal configured to receive a first threshold Vth1, a second input terminal configured to receive the drain-source voltage VDS, and an output terminal configured to provide a first comparison signal CR1 based on a comparison result of the drain-source voltage VDS with the first threshold Vth1; a second comparator COMP2 having a first input terminal configured to receive the drain-source voltage VDS, a second input terminal configured to receive a second threshold Vth2, and an output terminal configured to provide a second comparison signal CR2 based on a comparison result of the drain-source voltage VDS with the second threshold Vth2;

a pulse circuit TW1 having an input terminal coupled to the output terminal of the first comparator COMP1 to receive the first comparison signal CR1, an adjusting terminal configured to receive the slew rate threshold adjusting signal WD, and an output terminal configured to provide a pulse signal PUL based on the first comparison signal CR1 and the slew rate threshold adjusting signal WD, wherein when the first comparison signal CR1 flips from a second voltage level to a first voltage level, the pulse signal PUL has a pulse maintaining a time period T1, and wherein the time period T1 could be adjusted by the slew rate threshold adjusting signal WD; and a logic gate circuit GATE1 having a first input terminal configured to receive the pulse signal PUL, a second input terminal configured to receive the second comparison signal CR2, and an output terminal configured to provide the on control signal CON based on a logic operation to the pulse signal PUL and the second comparison signal CR2. In the example of FIG. 5, the first voltage level equals to the low voltage level and the second voltage level equals to the high voltage level, and the logic gate circuit GATE1 comprises an AND gate.

In one embodiment, the off control circuit 502 comprises a third comparator COMP3. The third comparator COMP3 receives the drain-source voltage VDS and a third threshold Vth3, and provides the off control signal COFF based on a comparison result of the drain-source voltage VDS with the third threshold Vth3.

In one embodiment, the logic circuit LG1 comprises a RS flip-flop FF1 having a set terminal "S" configured to receive the on control signal CON, a reset terminal "R" configured to receive the off control signal COFF, and an output terminal "Q" configured to provide the secondary control signal G2.

Figure 6:
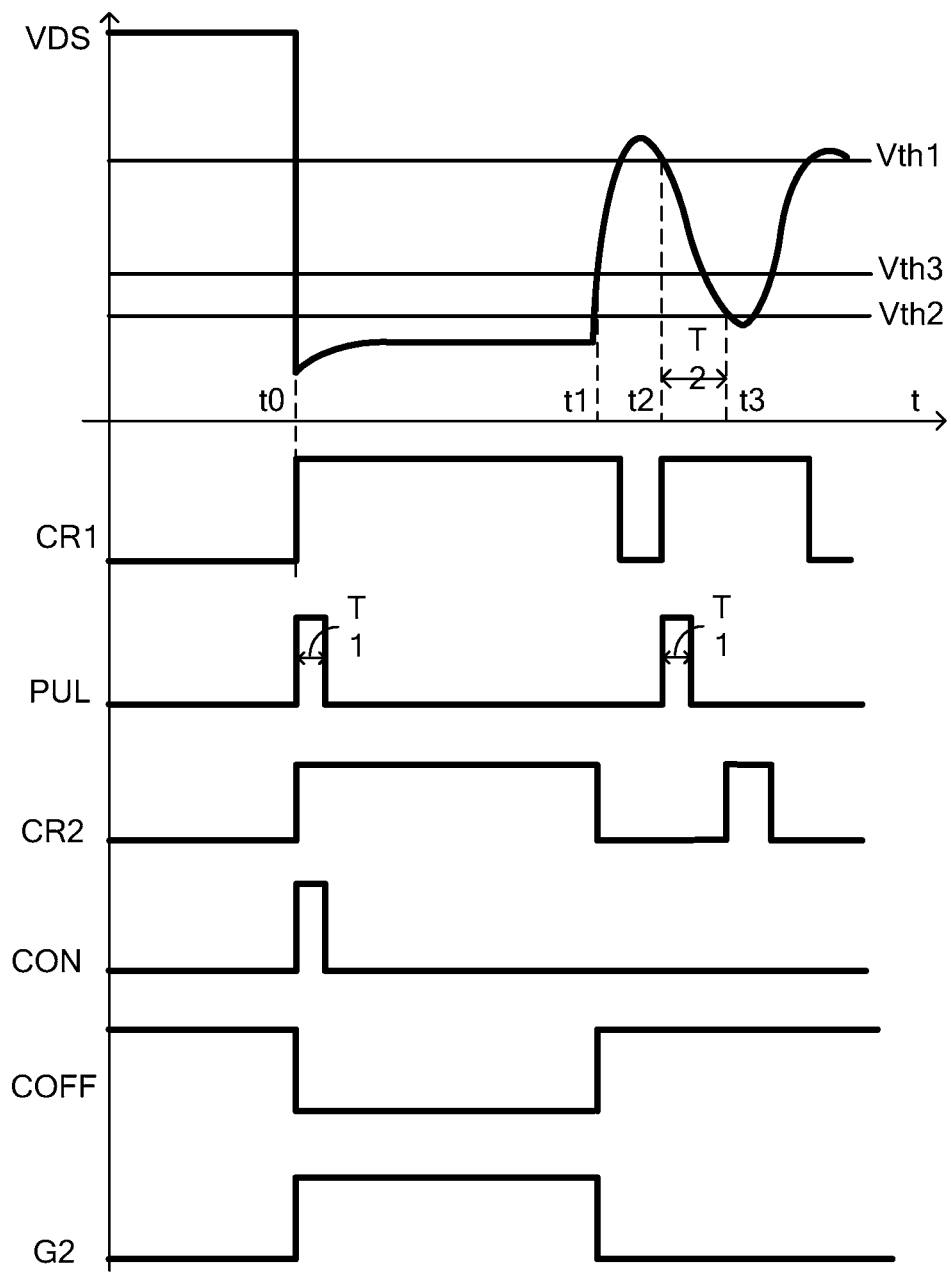
FIG. 6 schematically shows waveforms of signals of the secondary control circuit 50 under DCM.

FIG. 6 schematically shows waveforms of signals of the secondary control circuit 50 under DCM. The operation of the secondary control circuit 50 is illustrated with reference to FIGS. 5 and 6. As shown in FIG. 6, at time t0, because the primary switch SR1 is turned off, energy is transferred from the primary winding to the secondary winding of the transformer T1, and the body diode D2 of the synchronous rectifier SR2 is forward biased. As a result, the drain-source voltage VDS becomes negative, i.e., VDS<Vth1 and VDS<Vth2. At this time, both of the first comparison signal CR1 and the second comparison signal CR2 have high voltage level. Because the first comparison signal CR1 flips from low voltage level to high voltage level, the pulse of the pulse signal PUL is produced and keeps high for the time period T1. During the time period T1, because both of the pulse signal PUL and the second comparison signal CR2 have high voltage level, the logic gate circuit GATE1 generates the high on control signal CON to set the RS flip-flop FF1. As a result, the secondary control signal G2 is set high and turns on the synchronous rectifier SR2. At time t1, the drain-source voltage VDS rings to reach the third threshold Vth3, and the third comparator COMP3 provides the high off control signal COFF to reset the RS flip-flop FF1. As a result, the secondary control signal G2 is set low and turns off the synchronous rectifier SR2. At time t2, the drain-source voltage VDS rings to reach the first threshold Vth1, then the first comparison signal CR1 flips from low voltage level to high voltage level, and the pulse signal PUL has a pulse maintaining the time period T1 again. After a time period T2, i.e., at time t3, the drain-source voltage VDS is lower than the second threshold Vth2, and the second comparison signal CR2 flips to high voltage level. However, because T1<T2, the pulse of the pulse signal PUL is already over at time t3. As a result, the on control signal CON generated by the logic control circuit GATE1 keeps low. The RS flip-flop FF1 is not set and the secondary control signal G2 keeps low. So the synchronous rectifier SR2 is protected from mis-trigger. In the above embodiment, the slew rate of the first ring of the drain-source voltage VDS is (Vth1−Vth2)/T2, while the slew rate threshold is (Vth1−Vth2)/T1. Because T2>T1, (Vth1−Vth2)/T2<(Vth1−Vth2)/T1, which means the slew rate of the first ring of the drain-source voltage VDS is lower than the slew rate threshold, and the mis-trigger could be avoided.

In one embodiment, the thresholds Vth1–Vth3 has the relationship of: Vth1>Vth3>Vth2.

The slew rate of the drain-source voltage VDS during the ringing time is lower than that during the other time. So as long as the first threshold Vth1, the second threshold Vth2 and the time period T1 are properly set, i.e., the slew rate threshold is properly set, the mis-trigger could be avoided while the normal operation of the synchronous rectifier SR2 is maintained.

In one embodiment, the on control circuit 501 further comprises a minimum off time control circuit MOB. The second comparator COMP2 further comprises an enable terminal. The minimum off time control circuit MOB receives the secondary control signal G2, to detect the off time of the synchronous rectifier SR2. The minimum off time control circuit MOB disables the second comparator COMP2 before the off time of the synchronous rectifier SR2 reaches a minimum off time period set by the minimum off time control circuit MOB. The minimum off time control circuit MOB could be realized by multiple ways. For example, the minimum off time control circuit MOB could provide a disable signal DEN to the enable terminal of the second comparator COMP2 so as to disable the second comparator COMP2 before the low voltage time period of the secondary control signal G2 reaches the minimum off time period, wherein the low voltage time period of the secondary control signal G2 corresponds to the off time of the synchronous rectifier SR2 in the example of FIG. 5.

In one embodiment, the pulse circuit TW1 comprises edge-triggered pulse circuits. For example, the pulse circuit TW1 in FIG. 5 is a rising edge-triggered pulse circuit.

Figure 7:
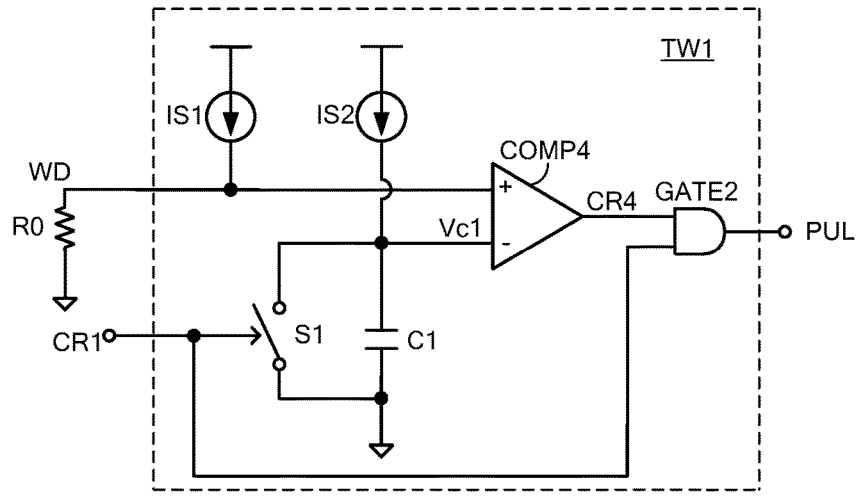
FIG. 7 schematically shows the structure of the pulse circuit TW1 in accordance with an embodiment of the present technology.

FIG. 7 schematically shows the structure of the pulse circuit TW1 in accordance with an embodiment of the present technology. As shown in FIG. 7, the pulse circuit TW1 comprises current sources IS1 and IS2, a capacitor C1, a switch S1 coupled in parallel with the capacitor C1, a comparator COMP4 and a logic gate circuit GATE2. The comparator COMP4 compares the slew rate threshold adjusting signal WD with a voltage Vc1 across the capacitor C1. The first comparison signal CR1 is adopted to control the switch S1. In one embodiment, when the first comparison signal CR1 is logic low, the switch S1 is turned on, then the voltage Vc1 approximates to zero, and the comparator COMP4 generates a fourth comparison signal CR4 with high voltage level. The fourth comparison signal CR4 is provided to the logic gate circuit GATE2. In the example of FIG. 7, the logic gate circuit GATE2 is an AND gate. Thus, the pulse signal PUL generated by the logic gate circuit GATE2 keeps low when the fourth comparison signal CR4 with high voltage level and the first comparison signal CR1 with low voltage level are received. When the first comparison signal CR1 flips from low voltage level to high voltage level, the switch S1 is turned off, and the current source IS2 provides a current to charge the capacitor C1. During a time period T1=C1×WD/IS2, the voltage Vc1 is lower than the value of the slew rate threshold adjusting signal WD, and the fourth comparison signal has high voltage level. Because both of the first comparison signal CR1 and the fourth comparison signal have high voltage level, the pulse signal PUL has a pulse with high voltage level. Then after the time period T1, the voltage Vc1 reaches the value of the slew rate threshold adjusting signal WD, the fourth comparator COMP4 flips and provides the comparison signal CR4 with low voltage level. As a result, the pulse signal PUL has low voltage level, and the pulse of the pulse signal PUL is over. In conclusion, only during a time period T1 right after the first comparison signal CR1 flips from low to high, the pulse signal PUL has a pulse with high voltage level. The slew rate threshold adjusting signal WD could be regulated by the off-chip resistor R0. In one embodiment, the slew rate threshold adjusting signal WD increases when the resistance of the off-chip resistor R0 increases. The time period T1 is proportional to the slew rate threshold adjusting signal WD. Accordingly, the slew rate threshold (Vth1−Vth2)/T1 is inversely proportional to the slew rate threshold adjusting signal WD. When the resistance of the off-chip resistor RO decreases, the slew rate threshold adjusting signal WD decreases, which means the time period T1 of the pulse of the pulse signal PUL decrease. Accordingly, the slew rate threshold (Vth1−Vth2)/T1 increases. In some embodiments, the time period T1 could be regulated by adjusting the capacitor C1 and the current source IS2.

Figure 8:
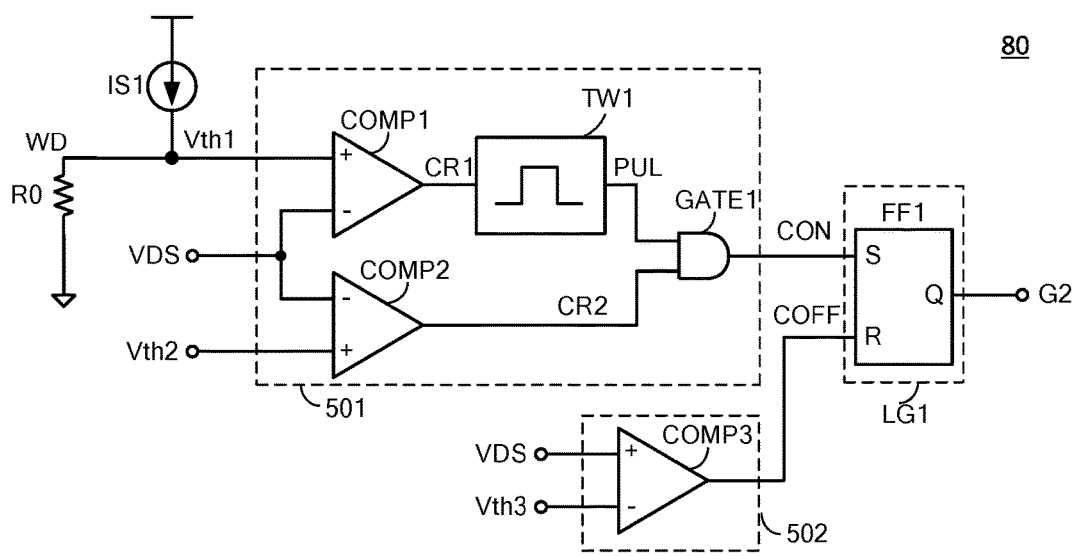
FIG. 8 schematically shows a secondary control circuit 80 in accordance with an embodiment of the present technology.

In other embodiments, the slew rate threshold adjusting signal WD could be adopted to adjust the first threshold Vth1 or the second threshold Vth2, so as to adjust the slew rate threshold (Vth1−Vth2)/T1. For example, the first threshold Vth1 or the second threshold Vth2 may be equal to the voltage signal across the off-chip resistor R0, i.e., the slew rate threshold adjusting signal WD. FIG. 8 schematically shows a secondary control circuit 80 in accordance with an embodiment of the present technology. In the example of FIG. 8, the slew rate threshold adjusting signal WD is adopted to adjust the first threshold Vth1. As shown in FIG. 8, the first threshold Vth1 could be regulated by changing the resistance of the off-chip resistor R0 while keeping the current source IS1 unchanged. In a similar way, the slew rate threshold adjusting signal WD could be adopted to adjust the second threshold Vth2 too.

In some embodiments, the off-chip resistor R0 could be replaced by other components, e.g., a capacitor or a MOSFET. Any component by changing the value to regulate the first threshold Vth1, the second threshold Vth2 or the pulse time period T1 of the pulse signal PUL, so as to regulate the slew rate threshold (Vth1−Vth2)/T1 of the drain-source voltage VDS, could be adopted.

In some embodiments, the slew rate threshold adjusting signal WD could be a voltage signal provided by other components or devices.

In one embodiment, the first voltage level is high voltage level, and the second voltage level is low voltage level. In other embodiments, the first voltage level could be low voltage level, and the second voltage level could be high voltage level. Accordingly, the logic gate circuits GATE1, GATE2 and the logic circuit LG1 need to be adjusted so as to maintain the proper working mechanics.

Figure 9:
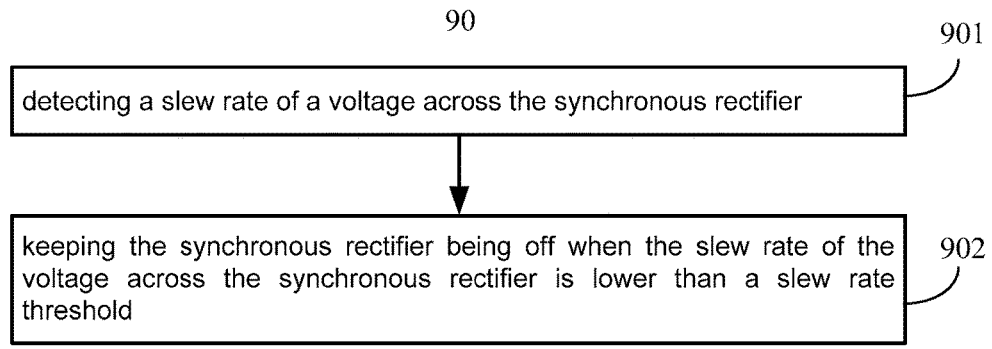
FIG. 9 shows a control method 90 of a switching converter in accordance with an embodiment of the present technology.

FIG. 9 shows a control method 90 of a switching converter in accordance with an embodiment of the present technology. The control method 90 comprises: step 901, detecting a slew rate of a voltage across the synchronous rectifier; and step 902, keeping the synchronous rectifier being off when the slew rate of the voltage across the synchronous rectifier is lower than a slew rate threshold.

In one embodiment, the step 902 comprises: providing a pulse signal based on a comparison result of a voltage across the synchronous rectifier with a first threshold, wherein the pulse signal has pulses when the voltage across the synchronous rectifier decreases to the first threshold, and each pulse maintains for a preset time period; providing a comparison signal based on a comparison result of the voltage across synchronous rectifier with a second threshold; and controlling the synchronous rectifier based on a logical operation to the pulse signal and the comparison signal, wherein the synchronous rectifier is turned on when the comparison signal indicates the voltage across the synchronous rectifier is lower than the second threshold during when the pulse signal has a pulse, otherwise, the synchronous rectifier is maintained being off.

In one embodiment, the step 902 further comprises turning off the synchronous rectifier when the voltage across the synchronous rectifier increases to a third threshold.

In one embodiment, the step 902 further comprises regulating the first threshold, the second threshold or a pulse time period of the pulse signal by an off-chip component. In one embodiment, the off-chip component comprises a resistor.

In one embodiment, the step 902 further comprises blocking the comparison signal before an off time of the synchronous rectifier reaches a preset minimum off time period.

Figure 10:
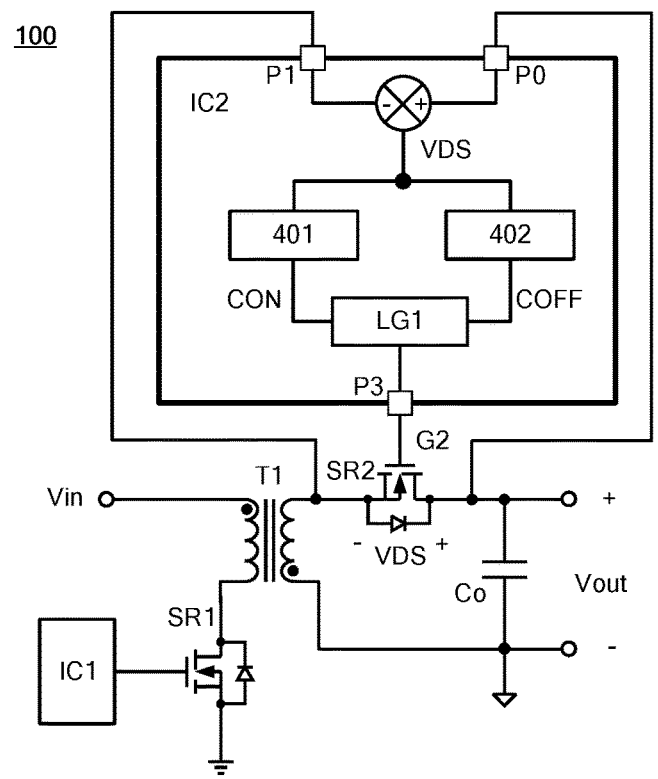
FIG. 10 schematically shows a switching converter 100 in accordance with an embodiment of the present technology.

FIG. 10 schematically shows a switching converter 100 in accordance with an embodiment of the present technology. Compared with the switching converter 40 in FIG. 4, the slew rate threshold of the drain-source voltage VDS is fixed in the switching converter 100. So the secondary control chip IC3 of the switching converter 100 only has the pins P0, P1 and P3. The operation of the switching converter 100 is similar with the operation of the switching converter 40 and is not described here for brevity.

Figure 11:
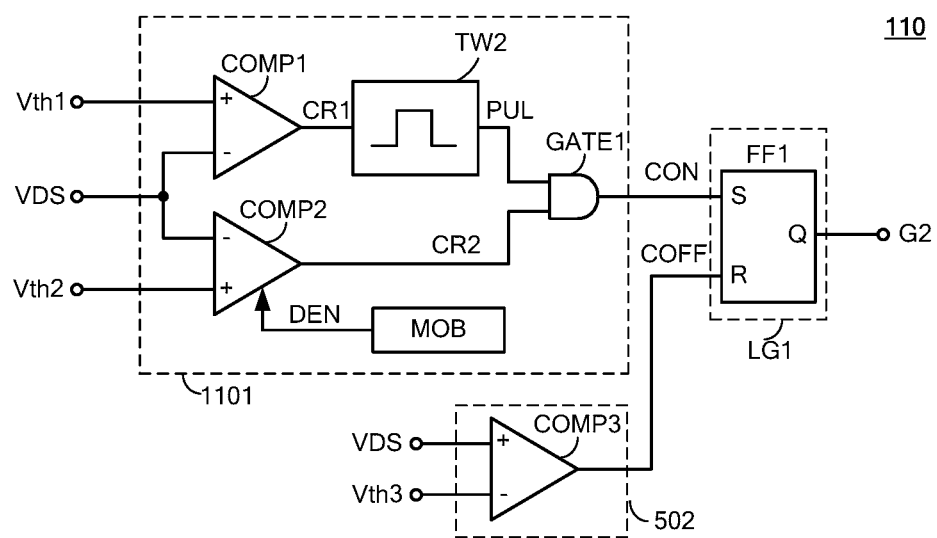
FIG. 11 shows a secondary control circuit 110 adopted in the switching converter 100 in accordance with an embodiment of the present technology.

Accordingly, FIG. 11 shows a secondary control circuit 110 adopted in the switching converter 100 in accordance with an embodiment of the present technology. Compared with the secondary control circuit 50 in FIG. 5, there is no slew rate threshold adjusting signal WD in the secondary control circuit 110. The pulse signal PUL has pulses when the rising edge of the first comparison signal CR1 is received by the pulse circuit TW2. The time period of the pulse of the pulse signal PUL is fixed. The operation of the secondary control circuit 110 is similar with the operation of the secondary control circuit 50, and is not described here for brevity.

Figure 12:
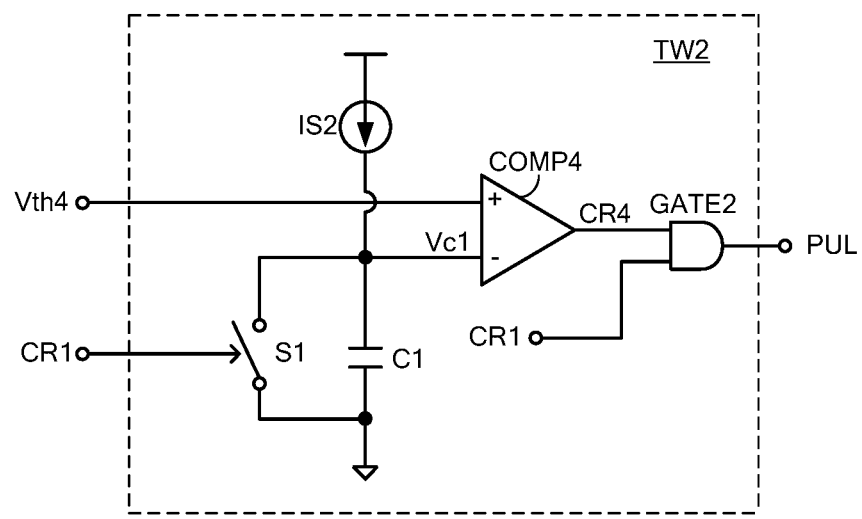
FIG. 12 schematically shows the pulse circuit TW2 in accordance with an embodiment of the present technology.

FIG. 12 schematically shows the pulse circuit TW2 in accordance with an embodiment of the present technology. Compared with the pulse circuit TW1 in FIG. 7, the fourth comparator COMP4 of the pulse circuit TW2 receives a fixed fourth threshold Vth4. The operation of the pulse circuit TW2 is similar with the operation of the pulse circuit TW1, and is not described here for brevity.

Flyback converter is used as an example to illustrate the present technology. Persons of ordinary skill in the art should know that the present technology could be adopted in other synchronous rectified switching converters, e.g., forward converter.

MOSFET is adopted as the synchronous rectifier of the flyback converter to illustrate the present technology. Persons of ordinary skill in the art should know that, other transistors could be adopted by the present technology too, e.g., IGBT.

Obviously many modifications and variations of the present technology are possible in light of the above teachings. It is therefore to be understood that within the scope of the appended claims the technology may be practiced otherwise than as specifically described. It should be understood, of course, the foregoing disclosure relates only to a preferred embodiment (or embodiments) of the technology and that numerous modifications may be made therein without departing from the spirit and the scope of the technology as set forth in the appended claims. Various modifications are contemplated and they obviously will be resorted to by those skilled in the art without departing from the spirit and the scope of the technology as hereinafter defined by the appended claims as only a preferred embodiment(s) thereof has been disclosed.

What is claimed is:

1. A synchronous switching converter comprising:
an energy storage component;
a synchronous rectifier coupled to the energy storage component;
a secondary control circuit configured to receive a slew rate threshold adjusting signal and a voltage across the synchronous rectifier, and to provide a secondary control signal based on the slew rate threshold adjusting signal and the voltage across the synchronous rectifier to control the synchronous rectifier; and
an off-chip component configured to provide the slew rate threshold adjusting signal;
wherein the secondary control circuit detects a slew rate of the voltage across the synchronous rectifier, and maintains the synchronous rectifier being off when the slew rate of the voltage across the synchronous rectifier is lower than a slew rate threshold;
wherein the secondary control circuit comprises:
a first comparator having a first input terminal configured to receive a first threshold, a second input terminal configured to receive the voltage across the synchronous rectifier, and an output terminal configured to provide a first comparison signal based on a comparison result of the voltage across the synchronous rectifier with the first threshold;
a second comparator having a first input terminal configured to receive the voltage across the synchronous rectifier, a second input terminal configured to receive a second threshold, and an output terminal configured to provide a second comparison signal based on a comparison result of the voltage across the synchronous rectifier with the second threshold;
a pulse circuit having an input terminal configured to receive the first comparison signal, an adjusting terminal configured to receive the slew rate threshold adjusting signal, and an output terminal configured to provide a pulse signal based on the first comparison signal and the slew rate threshold adjusting signal, wherein when the first comparison signal flips from a second voltage level to a first voltage level, the pulse signal has a pulse maintaining a time period, and wherein the time period could be adjusted by the slew rate threshold adjusting signal; and
a logic gate circuit having a first input terminal configured to receive the pulse signal, a second input terminal configured to receive the second comparison signal, and an output terminal configured to provide the on control signal based on a logic operation to the pulse signal and the second comparison signal.

2. The synchronous switching converter of claim 1, wherein the synchronous rectifier and the secondary control circuit are integrated in a secondary control chip, and wherein the secondary control chip has a pin coupled to the off-chip component.

3. A controller for a synchronous rectifier, comprising:
a first comparator having a first input terminal configured to receive a first threshold, a second input terminal configured to receive a voltage across the synchronous rectifier, and an output terminal configured to provide a first comparison signal based on a comparison result of the voltage across the synchronous rectifier with the first threshold;
a second comparator having a first input terminal configured to receive the voltage across the synchronous rectifier, a second input terminal configured to receive a second threshold, and an output terminal configured to provide a second comparison signal based on a comparison result of the voltage across the synchronous rectifier with the second threshold;
a pulse circuit having an input terminal configured to receive the first comparison signal, and an output terminal configured to provide a pulse signal based on the first comparison signal, wherein when the first comparison signal flips from a second voltage level to a first voltage level, the pulse signal has a pulse maintaining a preset time period; and
a first logic gate circuit having a first input terminal configured to receive the pulse signal, a second input terminal configured to receive the second comparison signal, and an output terminal configured to provide an on control signal based on a logic operation to the pulse signal and the second comparison signal;
wherein the on control signal controls on operation of the synchronous rectifier.

4. The controller of claim 3, further comprising an off control circuit having an input terminal configured to receive the voltage across the synchronous rectifier, and an output terminal configured to provide an off control signal based on the voltage across the synchronous rectifier, wherein the off control signal controls off operation of the synchronous rectifier.

5. The controller of claim 3, wherein the pulse circuit comprises:
a first current source configured to provide a current;
a capacitor coupled in series to the first current source to receive the current;
a switch coupled in parallel to the capacitor, wherein a control terminal of the switch receives the first comparison signal;
a fourth comparator having a first input terminal configured to receive a fourth threshold, a second input terminal coupled to a connection node of the first current source and the capacitor, and an output terminal configured to provide a fourth comparison signal based on the fourth threshold and a voltage across the capacitor; and
a second logic gate circuit having a first input terminal configured to receive the fourth comparison signal, a second input terminal configured to receive the first comparison signal, and an output terminal configured to provide the pulse signal based on the first comparison signal and the fourth comparison signal.

6. The controller of claim 3, wherein the first comparator, the second comparator, the pulse circuit, and the first logic gate circuit are integrated in a secondary control chip, and wherein the secondary control chip has a slew rate threshold adjusting pin configured to couple the first input terminal of the first comparator to an off-chip component.

7. The controller of claim 3, wherein the first comparator, the second comparator, the pulse circuit, and the first logic gate circuit are integrated in a secondary control chip, and wherein the secondary control chip has a slew rate threshold adjusting pin configured to couple the second input terminal of the second comparator to an off-chip component.

8. The controller of claim 3, wherein the pulse circuit further comprises an adjusting terminal configured to receive a slew rate threshold adjusting signal, and the output terminal of the pulse circuit provides the pulse signal based on the first comparison signal and the slew rate threshold adjusting signal, wherein the pulse time period of the pulse signal could be adjusted by the slew rate threshold adjusting signal.

9. The controller of claim 8, wherein the pulse circuit comprises:
- a first current source configured to provide a first current;
- a second current source configured to provide a second current to the adjusting terminal;
- a capacitor coupled in series to the first current source to receive the first current;
- a switch coupled in parallel to the capacitor, wherein a control terminal of the switch receives the first comparison signal;
- a fourth comparator having a first input terminal configured to receive the slew rate threshold adjusting signal, a second input terminal coupled to a connection node of the first current source and the capacitor, and an output terminal configured to provide a fourth comparison signal based on the slew rate threshold adjusting signal and a voltage across the capacitor; and
- a second logic gate circuit having a first input terminal configured to receive the fourth comparison signal, a second input terminal configured to receive the first comparison signal, and an output terminal configured to provide the pulse signal based on the first comparison signal and the fourth comparison signal.

10. The controller of claim 8, wherein the first comparator, the second comparator, the pulse circuit, and the first logic gate circuit are integrated in a secondary control chip, and wherein the secondary control chip has a slew rate threshold adjusting pin configured to couple the adjusting terminal of the pulse circuit to an off-chip component.

11. A control method of a synchronous rectifier, comprising:

detecting a slew rate of a voltage across the synchronous rectifier; and keeping the synchronous rectifier being off when the slew rate of the voltage across the synchronous rectifier is lower than a slew rate threshold;

wherein keeping the synchronous rectifier being off when the slew rate of the voltage across the synchronous rectifier is lower than a slew rate threshold comprises:
- providing a pulse signal based on a comparison result of the voltage across the synchronous rectifier with a first threshold, wherein the pulse signal has pulses when the voltage across the synchronous rectifier decreases to the first threshold, and each pulse maintains for a time period;
- providing a comparison signal based on a comparison result of the voltage across the synchronous rectifier with a second threshold; and
- controlling the synchronous rectifier based on a logical operation to the pulse signal and the comparison signal, wherein the synchronous rectifier is turned on when the comparison signal indicates the voltage across the synchronous rectifier is lower than the second threshold during when the pulse signal has a pulse, otherwise, the synchronous rectifier is maintained being off.

12. The control method of claim 11, further comprising turning off the synchronous rectifier when the voltage across the synchronous rectifier increases to a third threshold.

13. The control method of claim 11, further comprising blocking the comparison signal before an off time of the synchronous rectifier reaches a preset minimum off time period.

14. The control method of claim 11, further comprising regulating the first threshold with an off-chip component.

15. The control method of claim 11, further comprising regulating the second threshold with an off-chip component.

16. The control method of claim 11, further comprising regulating the time period of the pulse of the pulse signal with an off-chip component.

* * * * *